(12) United States Patent
Adamczyk et al.

(10) Patent No.: US 10,378,602 B2
(45) Date of Patent: Aug. 13, 2019

(54) DISC BRAKE FOR A COMMERCIAL VEHICLE

(71) Applicant: KNORR-BREMSE Systeme fuer Nutzfahrzeuge GmbH, Munich (DE)

(72) Inventors: Philipp Adamczyk, Stoettwang (DE); Christian Scheufler, Munich (DE); Matthias Klingner, Moorenweis (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 15/581,273

(22) Filed: Apr. 28, 2017

(65) Prior Publication Data

US 2017/0234388 A1 Aug. 17, 2017

Related U.S. Application Data

(63) Continuation of application No. PCT/EP2015/074670, filed on Oct. 23, 2015.

(30) Foreign Application Priority Data

Oct. 30, 2014 (DE) .................. 10 2014 115 762

(51) Int. Cl.
*F16D 65/18* (2006.01)
*F16D 121/14* (2012.01)
(Continued)

(52) U.S. Cl.
CPC ........... *F16D 65/18* (2013.01); *F16D 65/183* (2013.01); *F16D 2121/08* (2013.01);
(Continued)

(58) Field of Classification Search
CPC .... F16D 65/18; F16D 65/183; F16D 2121/14; F16D 2125/28; F16D 2125/32
See application file for complete search history.

(56) References Cited

U.S. PATENT DOCUMENTS

| 5,547,048 | A | | 8/1996 | Anthony |
| 5,582,273 | A | * | 12/1996 | Baumgartner .......... F16D 65/18 |
| | | | | 188/106 F |

(Continued)

FOREIGN PATENT DOCUMENTS

| DE | 42 12 384 A1 | 10/1993 |
| DE | 44 30 258 C1 | 1/1996 |

(Continued)

OTHER PUBLICATIONS

International Search Report (PCT/ISA/210) issued in PCT Application No. PCT/EP2015/074670 dated Feb. 17, 2016 with English translation (Four (4) pages).

(Continued)

*Primary Examiner* — Vishal R Sahni
(74) *Attorney, Agent, or Firm* — Crowell & Moring LLP

(57) ABSTRACT

A disc brake for a commercial vehicle has a brake caliper spanning a brake disc on the vehicle side, in which brake caliper a clamping device is arranged which has a pivotable brake lever engaging in at least one bridge carrying a brake plunger, which at the same time is directly or indirectly supported at the inner side of a wall of the brake caliper. The contact area of the bridge at the brake lever or of the brake lever at the brake caliper is configured as a pivot bearing having a bearing shell cross-sectionally configured as an arc forming a part of the pivot bearing. The bearing shell is placed in a seating. The disc brake is configured such that the bearing shell is located in the pivoting direction of the brake lever with its opposite longitudinal borders at stop edges, which longitudinally limit the trough-shaped seating.

20 Claims, 7 Drawing Sheets

(51) Int. Cl.
  *F16D 125/32* (2012.01)
  *F16D 121/08* (2012.01)
  *F16D 123/00* (2012.01)
  *F16D 125/14* (2012.01)
(52) U.S. Cl.
  CPC ...... *F16D 2121/14* (2013.01); *F16D 2123/00* (2013.01); *F16D 2125/14* (2013.01); *F16D 2125/32* (2013.01)

(56) References Cited

U.S. PATENT DOCUMENTS

| | | | | |
|---|---|---|---|---|
| 5,622,240 A | * | 4/1997 | Hartl | F16D 65/183 188/72.6 |
| 5,819,884 A | | 10/1998 | Giering | |
| 5,927,445 A | * | 7/1999 | Bieker | F16D 55/226 188/71.1 |
| 2005/0211509 A1 | * | 9/2005 | Severinsson | F16D 65/183 188/72.9 |

FOREIGN PATENT DOCUMENTS

| | | |
|---|---|---|
| DE | 295 10 331 U1 | 10/1996 |
| DE | 10 2005 034 739 A1 | 2/2007 |
| DE | 10 2008 029 315 A1 | 12/2009 |
| DE | 10 2012 006 112 A1 | 10/2013 |
| EP | 0 790 430 A1 | 8/1997 |
| EP | 2 385 268 A1 | 11/2011 |
| KR | 10-2013-0135203 A | 12/2013 |
| WO | WO 96/36819 A1 | 11/1996 |

OTHER PUBLICATIONS

German-language Written Opinion (PCT/ISA/237) issued in PCT Application No. PCT/EP2015/074670 dated Feb. 17, 2016 (Five (5) pages).

Chinese-language Office Action issued in counterpart Chinese Application No. 201580058809.2 dated Jul. 9, 2018 (two pages).

* cited by examiner

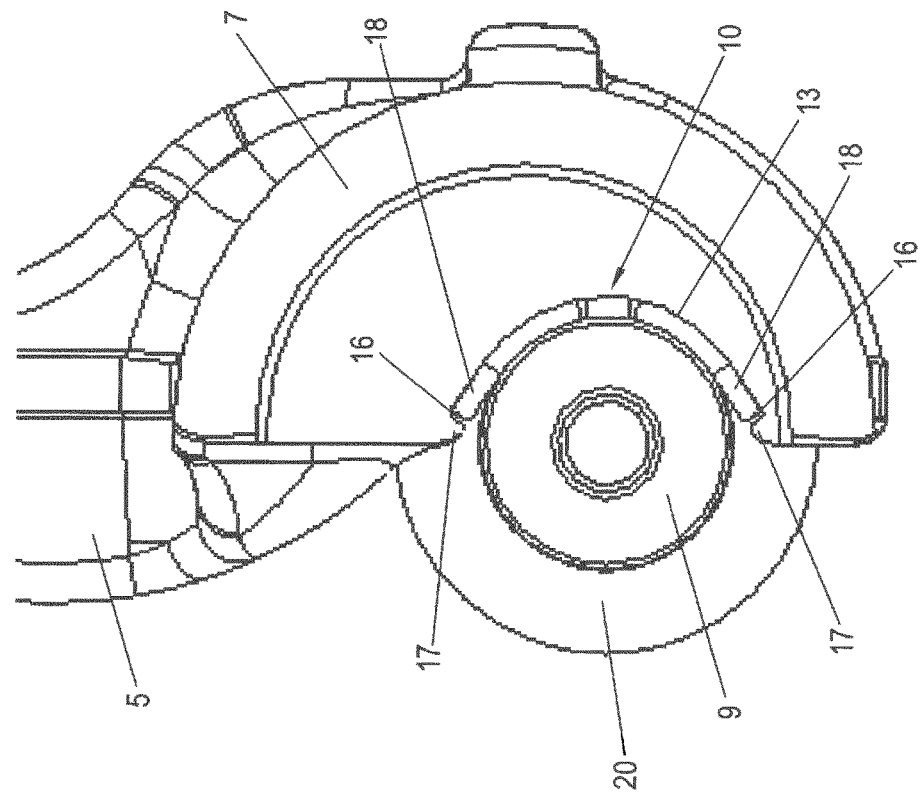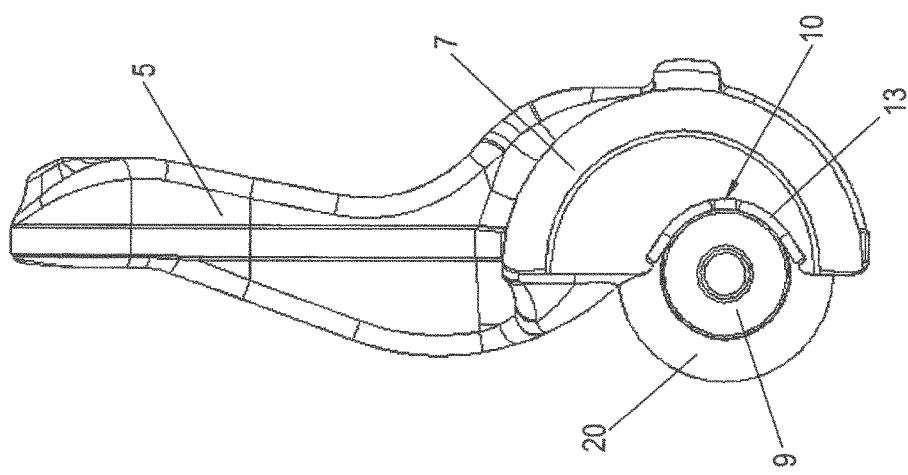

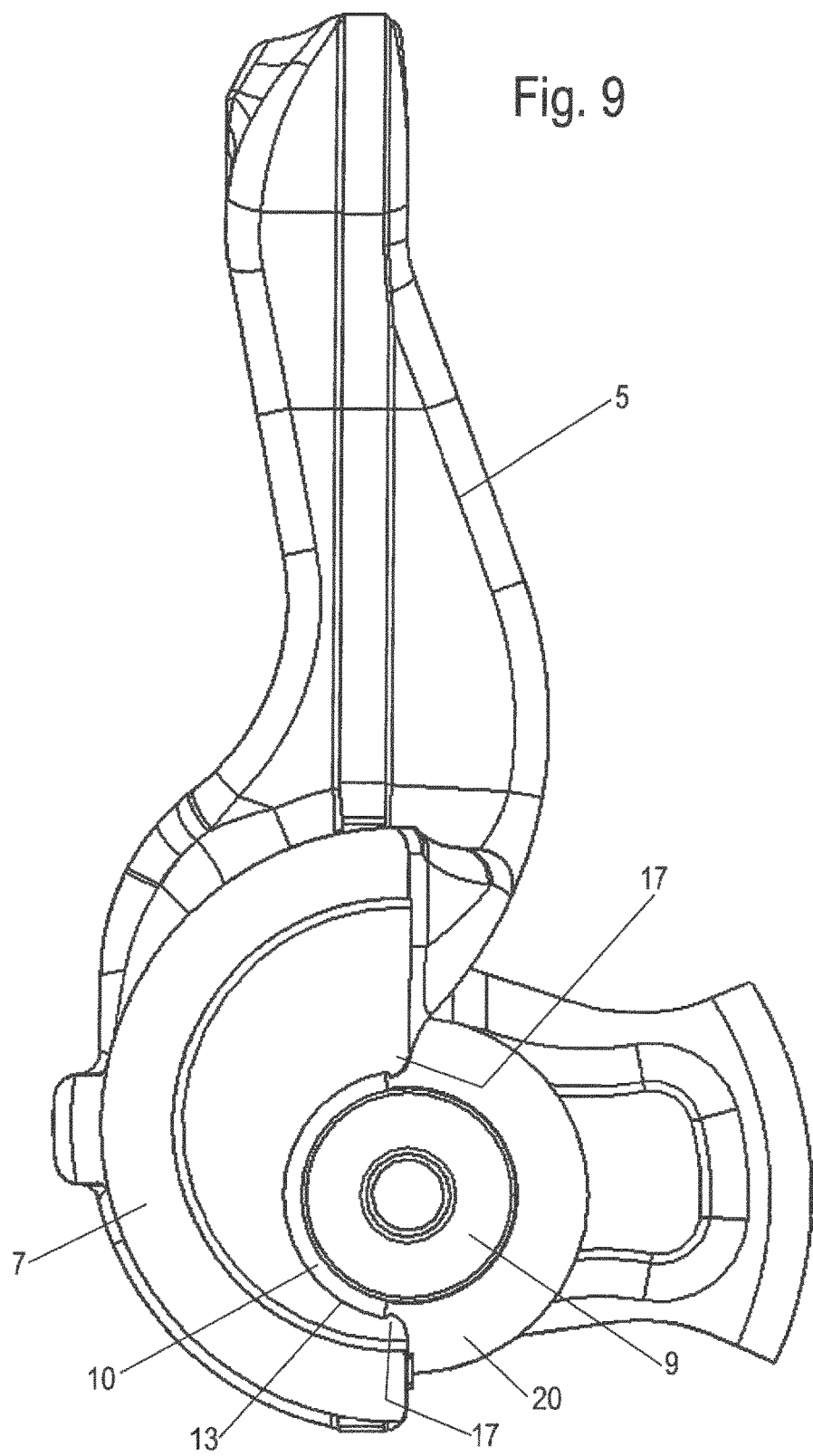

DISC BRAKE FOR A COMMERCIAL VEHICLE

CROSS REFERENCE TO RELATED APPLICATIONS

This application is a continuation of PCT International Application No. PCT/EP2015/074670, filed Oct. 23, 2015, which claims priority under 35 U.S.C. § 119 from German Patent Application No. 10 2014 115 762.1, filed Oct. 30, 2014, the entire disclosures of which are herein expressly incorporated by reference.

BACKGROUND AND SUMMARY OF THE INVENTION

The invention relates to a disc brake for a commercial vehicle.

The clamping device of such a disc brake is pneumatically or electromechanically actuatable, wherein for this purpose the clamping device has a pivotable brake lever, which in the support region is embodied as a cam and, on the one hand, supports itself on a wall of the brake caliper and, on the other hand, on a displaceable bridge, for the purpose of which in the latter case a roller is positioned between the brake lever and the bridge.

For mounting the roller, a bearing shell which is configured in a circle-shaped arc in cross section is arranged in the brake lever, which is held in a trough-like seating of the brake lever, for example by riveting.

This bearing shell is designed as a so-called DU mounting, with a substrate, for example of steel, an intermediate layer of sinter material and a plastic coating, in order to obtain adequate sliding capability, which however, due to design-related history, is provided with a proportion of lead.

Under environmental aspects, the lead is considered problematic such that there are demands which aim at providing the bearing shell in a configuration which with respect to the material selection is not problematic.

Independently of this, milling out of the substrate material of the DU mounting occurs with the known bearing shell with increasing service life because of the numerous pivot movements of the brake lever, so that an optimized service life is not achieved.

Consequently, this leads to relatively high repair costs in order to continually ensure the operational safety of the disc brake. The costs resulting from this include the costs of the assembly and disassembly, the replacement part procurement, and the stoppage times of the vehicle for the duration of the repair.

These costs are incurred more or less independently of where the sliding bearing is arranged. The bearing shell, as mentioned, can be provided in the brake lever, where it then corresponds with a roller, which is connected to the bridge. It can also be provided on the bridge itself, with forming of a roller or a comparable bead on the brake lever. And it can be provided on the inside of a wall of the brake caliper, in the case of which for completing the sliding bearing the roller is likewise molded on or arranged as a bead on the brake lever. In this latter case, the replacement of the bearing shell proves to be particularly complicated and expensive because of the aggravated accessibility.

The invention is based on the object of further developing a disc brake of the generic type so that its service life, in particular that of the clamping device, is substantially extended with low expenditure in terms of design and production.

This object is solved through a disc brake in accordance with embodiments of the invention.

By this configuration of the arrangement of the bearing shell in the seating according to the invention, the bearing shell is practically clamped-in in the pivot direction of the brake lever so that, in contrast with the prior art, it cannot migrate beyond the original dimension. The described milling, as could be observed up to now, is thereby effectively prevented.

Here, the type of the stop edges, i.e. their shape, can be distinct. What is important is that a deformation of the bearing shell through the correspondence with the roller is practically excluded.

Besides these functional advantages, which lead to a significantly extended service life, from which a quite remarkable cost savings materializes, the modification of the new bearing shell compared with a known bearing shell is also significantly improved. This is especially due to the fact that DU sliding bearings can be employed, the sliding layer of which can practically make do without sliding addition.

The production of the bearing shell and not least its fastening in the seating prove to be significantly simplified since no rotation prevention needs to be provided any longer.

Since the bearing shell retains its original shape permanently, even after an operating duration that is far beyond what can be currently achieved, an exact guidance of the roller is always provided.

As has been surprisingly shown, the configuration of the sliding bearing according to the invention leads to a substantial increase of the relevant load cycle numbers, wherein very high load absorptions can be achieved with relatively favorable sliding bearing materials.

The stop edges are preferentially introduced into the long-side edge regions of the seating located opposite one another in a chip-removing manner and can be distinct in their design. Instead of a chip-removing design, the stop edges can also be realized in a casting method.

The cross-sectional shape of the stop edges can be present in the manner of a slot, possibly with minor demolding bevels, against which the bearing shell lies with edge-sided angled-off portions adapted thereto.

It is also contemplated to form the respective stop edge by a groove, in which a suitably formed edge of the bearing shell is held by flanging, crimping or clipping in place. Here, the groove can be embodied both angularly and also as a fillet that is round or non-round in cross section.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 6A and 6B show a further exemplary embodiment of the invention likewise by way of a brake lever represented in detail in a lateral view.

FIG. 9 shows a further exemplary embodiment of the invention likewise by way of a brake lever represented in detail in a lateral view.

DETAILED DESCRIPTION OF THE DRAWINGS

Figure 1:
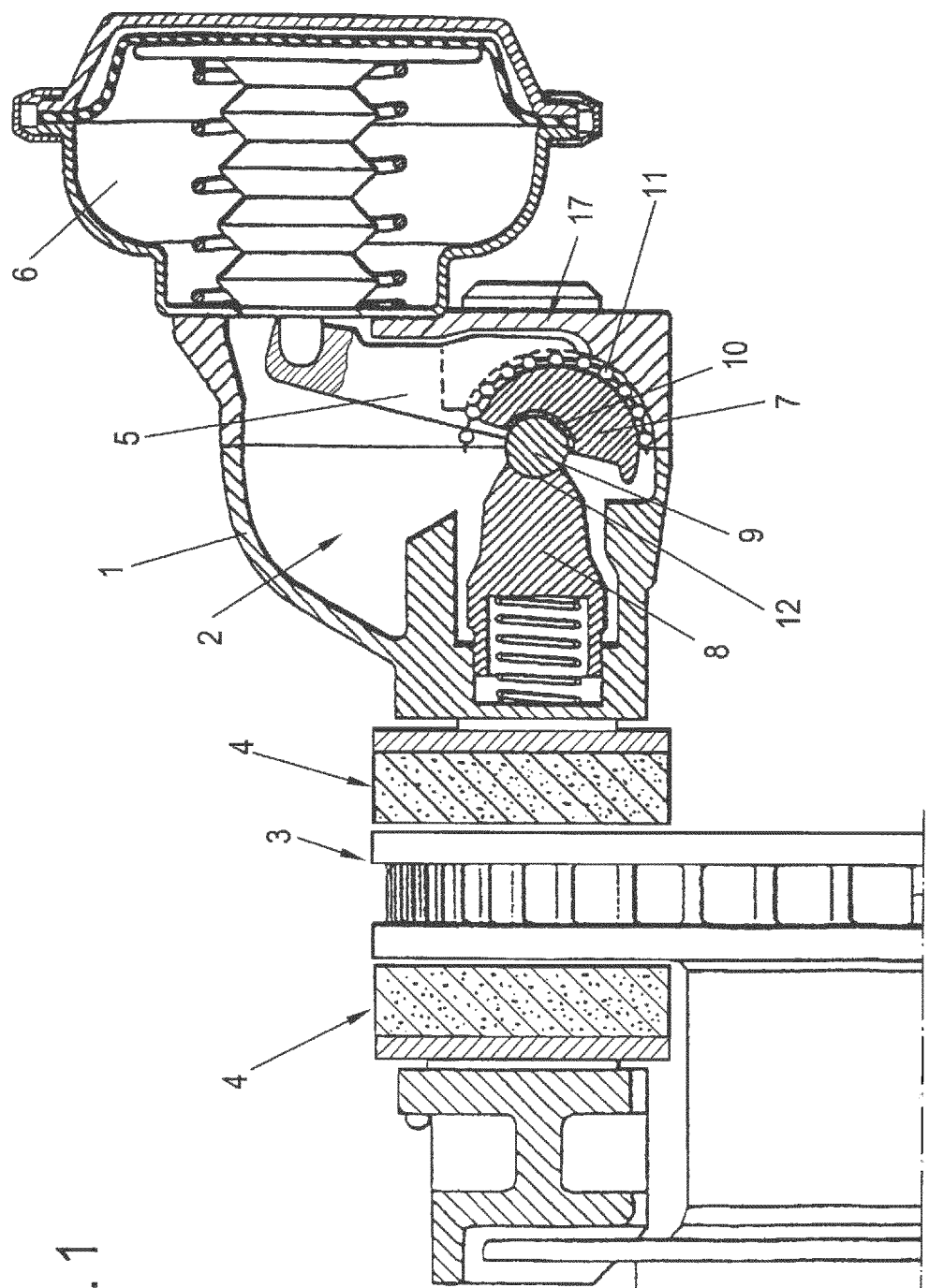
FIG. 1 is a schematic cross-sectional view of a disc brake according to an embodiment of the invention.

In FIG. 1, a disc brake for a commercial vehicle is shown in a section in schematic representation, which includes a brake disc 3, which is fastened to an axle of the commercial vehicle (not shown) and is engaged about by a brake caliper 1, which is displaceable in the direction of the brake disc 3.

In the brake caliper 1, a clamping device 2 is arranged, with which upon a brake application triggered by a preferentially pneumatically actuated brake cylinder 6, brake pads 4 can be pressed against the brake disc 3.

To this end, the clamping device 2 acts on two brake plungers which are not shown and are arranged parallel and spaced from one another in a bridge 8 and designed as adjusting screws.

The clamping device 2 has a brake lever 5 which is operationally connected with the brake cylinder 6 and, upon its actuation, is pivoted in the direction of the brake disc 3 about a roller 9, which runs parallel to the plane of the brake disc 3.

Furthermore, rolling bearings 11 are provided in the brake caliper 1, each with rolling bodies held in a cage, which support themselves on the one hand on the brake lever 5 which in this region is designed as a cam 7 and on the inside of a wall of the brake caliper 1 on the other hand.

The roller 9, which serves as pivot bearing for the brake lever 5, lies in a bearing shell 10 of the brake lever 5, which in cross section is likewise adapted to the cross-sectional contour of the roller 9 as a concave trough 12, in which the roller 9 lies on the other hand, wherein the roller 9 jointly with the bearing shell 10 form a sliding bearing.

Figure 2:
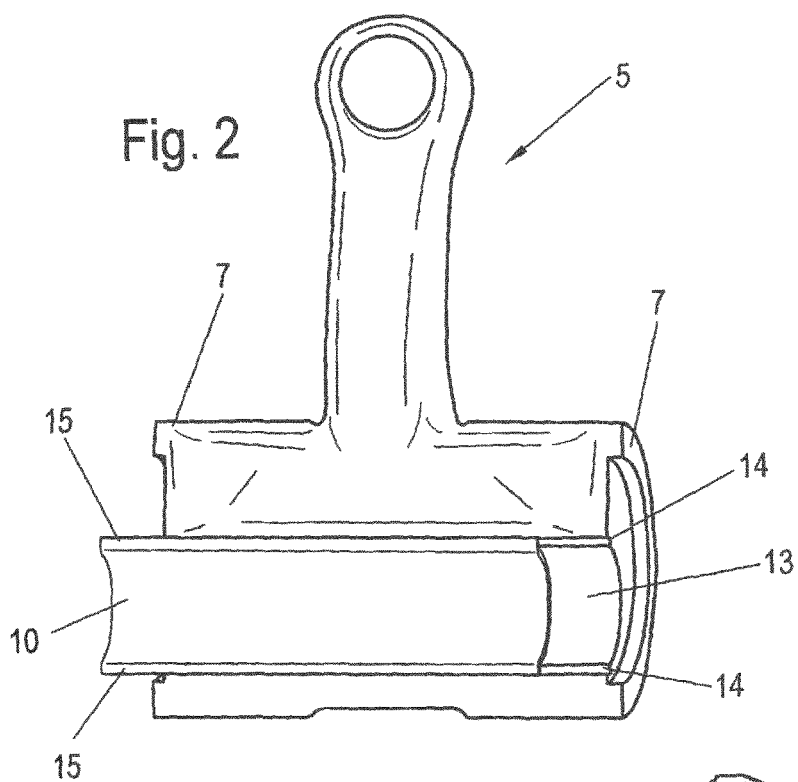
FIG. 2 shows a brake lever of the disc brake in a perspective front view.

In FIG. 2, the brake lever 5 is shown as detail. Therein it is evident that the bearing shell 10 lies in a trough-like seating 13 of the brake lever 5, which is designed in a circle-shaped arc in cross section, wherein the depiction of the bearing shell 10 is not yet completely inserted.

Figure 3A:
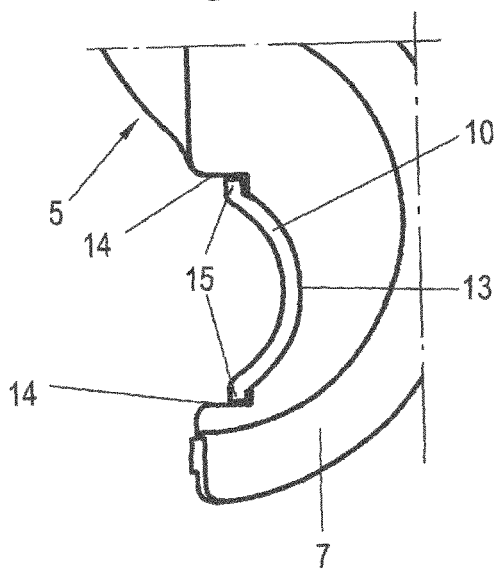
FIGS. 3A and 3B show an exemplary embodiment of the invention by way of a brake lever (FIG. 3A) represented in detail (FIG. 3B) in a lateral view.
Figure 3B:
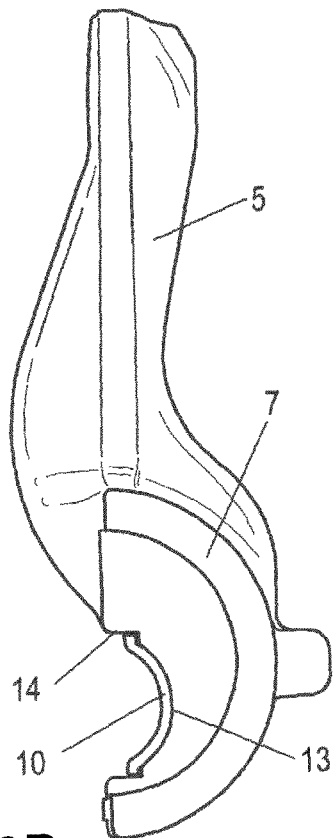

The two edge regions 14 of the seating 13 located opposite one another and forming the longitudinal edges are designed as stop edges, which in this example are each present in the form of a slot 14, as they are depicted enlarged in FIGS. 3A and 3B.

Angled legs 15 of the bearing shell 10 lie against these slots 14, which legs 15 form the longitudinal edges of the bearing shell 10 and serve for displacement protection of the bearing shell 10 in the pivot direction of the brake lever 5.

The two bearing slots 14 located opposite one another are clearly noticeable in FIGS. 3A and 3B, wherein FIG. 3B reflects an enlarged extract of the relevant region of FIG. 3A. It is visible that the slots 14 located opposite one another have surfaces which are parallel to one another, which in each case form a stop for the legs 15.

With this embodiment, the bearing shell 10 merely has to be placed into the seating 13. Retention against the insertion direction in the seating 13 is effected by the mounted roller 9.

Figure 4A:
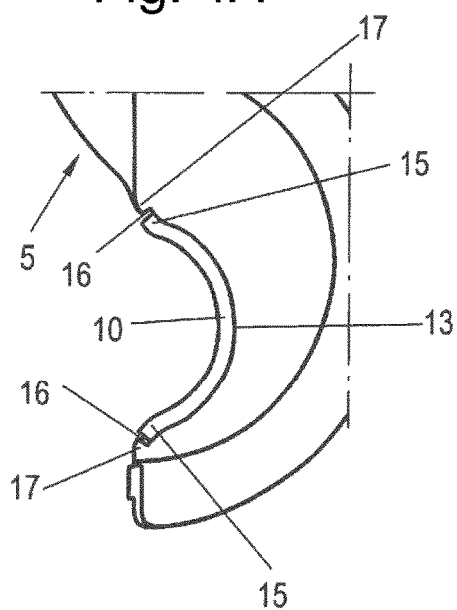
FIGS. 4A and 4B show a further exemplary embodiment of the brake lever, likewise in a lateral view.
Figure 4B:
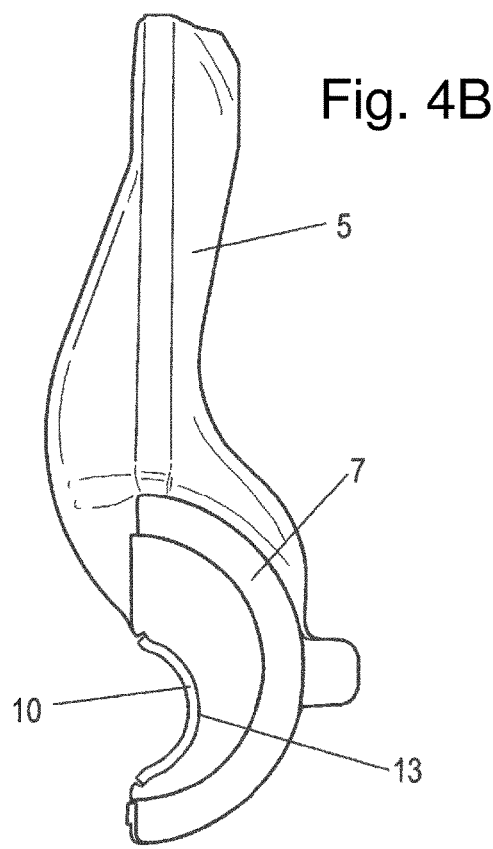

In the exemplary embodiment shown in FIGS. 4A and 4B, which in FIG. 4B reflects an enlarged extract of the bearing region according to FIG. 4A, the stop edges which are located opposite one another, delimiting the trough-like seating 13 longitudinally, are formed by grooves 16, forming lugs 17, against which the bearing shell 10 lies and by way of which the bearing shell 10 is locked in the transverse direction to the longitudinal extent.

Inserting the bearing shell 10 in the seating 13 can take place by lateral pushing in or clipping in, wherein the latter takes place by pressing the bearing shell 10 transversely to the longitudinal axis subject to deforming the legs 15, which then because of the inherent restoring forces spring into the grooves 16.

However it is also contemplated to form the grooves 16 by way of flanging or crimping.

In an exemplary embodiment, grooves 16 are formed which act as stop edge for the longitudinal edges of the bearing shell 10 located opposite them. In an alternative exemplary embodiment, the stop edges for the longitudinal edges of the bearing shell 10 are formed by lugs 17 or at least one protrusion. Here, the lug 17 or the protrusion can extend over the length of the seating 13 or extend partially or in certain sections over the length of the seating 13. In a particular embodiment example, the lugs 17 are formed by grooves 16. Here, the grooves 16 can be formed in the region of the bearing seat or of the seating 13 or in an edge region outside the seating 13.

Figure 5:
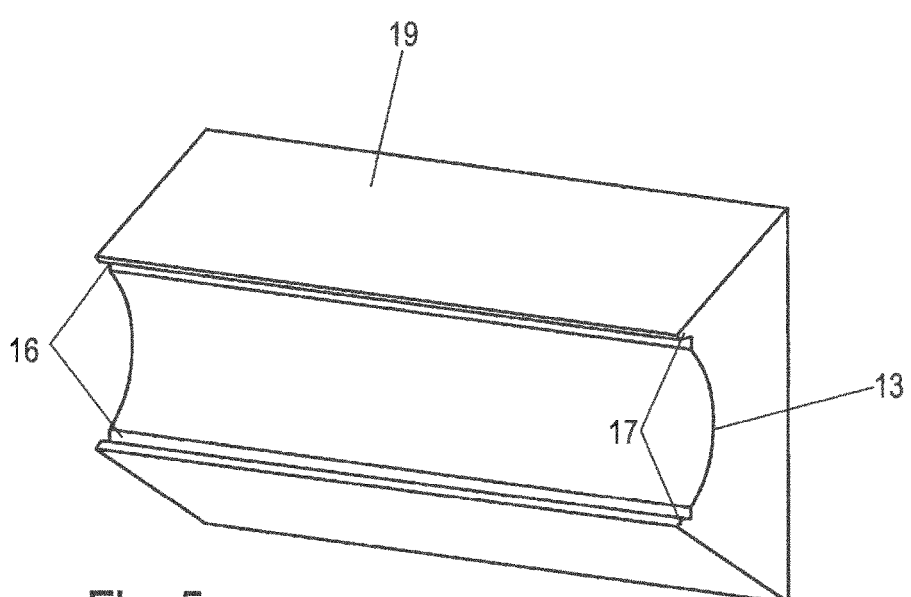
FIG. 5 shows a further exemplary embodiment of the invention in a schematic extract of a brake caliper.

While with the exemplary embodiments shown in FIGS. 1-4 the bearing shell 10 is held in the brake lever 5, a further version is indicated in FIG. 5, in which the seating 13 is provided on the inside of a wall 19 of the brake caliper 1, which is only schematically indicated here. Here, too, the trough-like seating 13 at its longitudinal edges located opposite one another, comprises stop edges delimiting the seating 13, here in the form of grooves 16. Obviously, other forms of the stop edges are also possible here, for example slots 14.

In FIGS. 6A and 6B, a further embodiment of the invention is depicted, wherein FIG. 6B reflects an enlarged extract of the bearing region according to FIG. 6A. In particular, in FIG. 6B it is evident that end regions 18 of the seating 13 and of the bearing shell 10 facing the grooves 16 run tangentially as quasi extended legs which lie against the lugs 17. To this end, the clear distance of the lugs 17 to one another is smaller than the outer distance of the associated longitudinal edges of the bearing shell 10 to one another.

In an exemplary embodiment which is not shown here, the lugs 17 can also be formed by protrusions. Here, the seating 13 and the protrusions are formed in two parts or three parts. The trough-like or arc of a circle-shaped seating 13, which in the exemplary embodiment shown in FIG. 6 runs out tangentially at the longitudinal edges, is delimited by a stop consisting of at least one further component, such as for example of a plate or a metal sheet. The portion of the plate or of the metal sheet described as stop here forms the protrusion. The plate or the metal sheet can, for example, be connected to the brake lever 5 by way of wobble riveting. Almost any other types of connections are also contemplated.

In an exemplary embodiment, the brake lever 5, at least in its basic form, is a casting. In a first production version, the seating 13 which is prepared in the cast is worked in a first step of calibrating or dimensional stamping. In a second method step, the tangential extension seating 13 is milled with a form cutter or milled for forming the lug 17. In an alternative production method, the two mentioned method steps are combined and the trough-like seating 13 with the two grooves 16 is formed in an operational step with a suitable form cutter with the appropriate tolerances.

Figure 8:
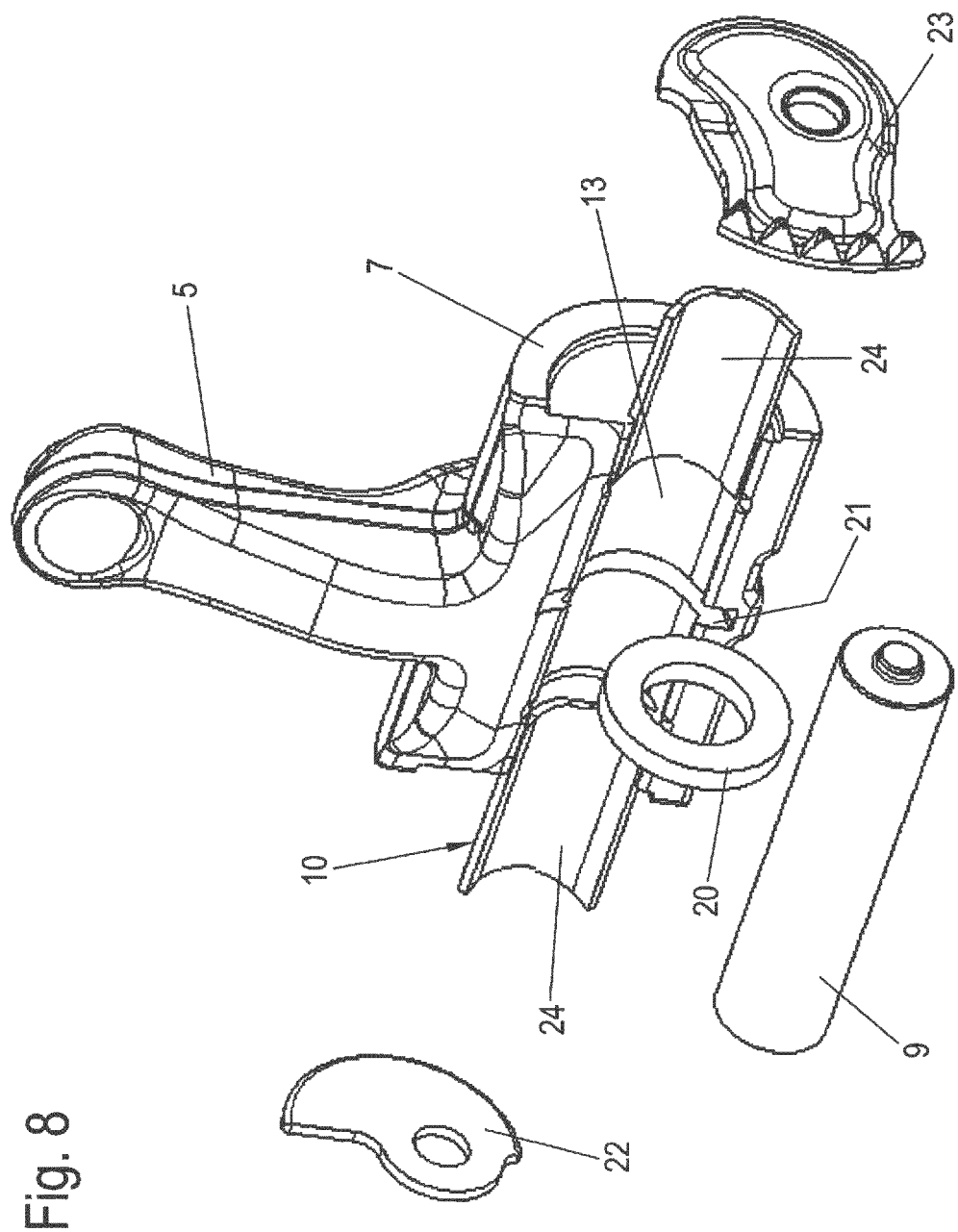
FIG. 8 shows the brake lever according to FIGS. 6 and 7 in an exploded representation.

In a method step following thereon, the bearing shell 10 or two portions 24, as are shown in FIG. 8, are pushed or clipped into the seating 13.

To exactly shape the seating 13, the same can be shaped in an alternative production method by slotting or broaching.

Figure 7:
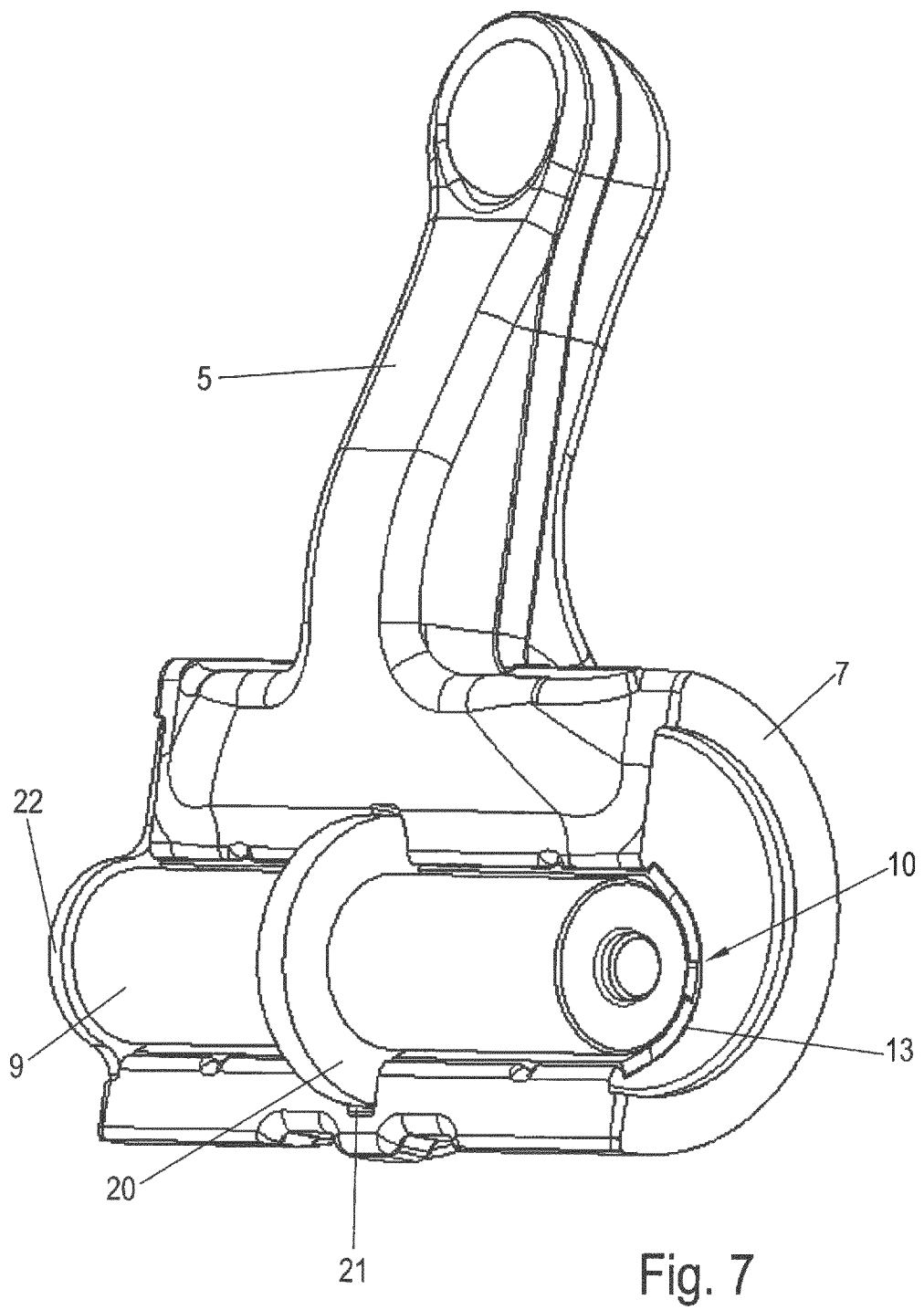
FIG. 7 shows the brake lever according to FIG. 6 in a perspective view.

As is reflected in FIGS. 7 and 8, the bearing shell 10 in this exemplary embodiment consists of two shell-like portions 24, which are positioned on both sides of a recess 21 provided in the brake lever 5, i.e. in the seating 13, and extending in the pivot direction of the brake lever 5. Here, the two shell-like portions 24 are each pushed into the seating 13 from a side of the brake lever 5 and axially secured by locking devices 22, 23 that are connected to the roller 9.

In the recess 21, a locking ring 20 engages, which is preferentially guided with play on the roller 9, wherein the curvature of the recess 21 corresponds to the outer radius of the locking ring 20, which otherwise forms a displacement limit for the portions 24 in the direction of the recess 21.

FIG. 9 shows a further exemplary embodiment of the present invention in a lateral view. Compared with the exemplary embodiment described by way of the preceding figures, the bearing is formed without tangential transition. The arc of a circle-shaped seating 13 is delimited by the lugs 17, while the likewise arc of a circle-shaped in cross section bearing shell 10 lies against the lugs 17 on the edge side.

LIST OF REFERENCE NUMBERS

1 Brake caliper
2 Clamping device
3 Brake disc
4 Brake pads
5 Brake lever
6 Brake cylinder
7 Cam
8 Bridge
9 Roller
10 Bearing shell
11 Rolling bearing
12 Trough
13 Seating
14 Slot
15 Leg
16 Groove
17 Lug
18 End region
19 Wall
20 Locking ring
21 Recess
22 Locking device
23 Locking device
24 Portion The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A disc brake for a commercial vehicle, comprising:
 a brake caliper engageable over a brake disc;
 a clamping device arranged in the brake caliper, the clamping device comprising a pivotable brake lever that acts on a bridge supporting at least one brake plunger,
wherein
 the brake lever directly or indirectly supports itself on an inside wall of the brake caliper,
 a contact region of: (i) the bridge on the brake lever or (ii) the brake lever on the brake caliper, is formed as a pivot bearing,
 the pivot bearing comprising a bearing shell configured as a circle-shaped arc in cross-section,
 a seating in which the bearing shell is arranged,
 the bearing shell is locked in a pivoting direction of the brake lever by longitudinal edges of the bearing shell located opposite one another, the longitudinal edges engaging longitudinal stop edges of the seating which delimiting a trough-shape of the seating such that the bearing shell is blocked against movement in the pivoting direction by the longitudinal stop edge.
2. The disc brake as claimed in claim 1, wherein the stop edges are formed as slots.
3. The disc brake as claimed in claim 2, wherein the slots located opposite one another have stop surfaces that are parallel to one another.
4. The disc brake as claimed in claim 1, wherein the stop edges are formed as lugs and/or grooves.
5. The disc brake as claimed in claim 4, wherein the longitudinal edges of the bearing shell are formed as angled legs which lie in slots or the grooves.
6. The disc brake as claimed in claim 4, wherein end regions of the seating and of the bearing shell facing the grooves run tangentially.
7. The disc brake as claimed in claim 4, wherein a clear distance of the lugs to one another is smaller than an outer distance of the associated longitudinal edges of the bearing shell to one another.
8. The disc brake as claimed in claim 4, wherein the grooves are of angular or round design in cross section.
9. The disc brake as claimed in claim 4, wherein the grooves, following the inserting of the bearing shell, are formed by crimping or flanging.
10. The disc brake as claimed in claim 4, wherein the bearing shell is clipped into the grooves.
11. The disc brake as claimed in claim 1, wherein the bearing shell is held in the seating by an abutting roller or sliding edge.
12. The disc brake as claimed in claim 1, wherein the bearing shell comprises two shell-shaped portions.
13. The disc brake as claimed in claim 11, wherein on the roller a locking ring is guided, which engages in a recess provided in the trough-shaped seating of the brake lever and extending in the pivot direction of the brake lever.
14. The disc brake as claimed in claim 13, wherein a curvature radius of the recess corresponds to an outer radius of the locking ring.
15. A pivotable brake lever bearing arrangement for a commercial vehicle disc brake, comprising:
 a pivotable brake lever configured to pivot about a rotational axis during actuation of the disc brake;
 a pivot bearing encompassing the rotational axis, wherein the pivot bearing comprises a bearing seating and a bearing shell arranged in the bearing seating,
 the bearing seating having a trough-shape extending in a longitudinal direction of the bearing seating,
 the bearing shell is cross-sectionally configured as a circle-shaped arc, the bearing seating has oppositely located stop edges, and
the bearing shell is locked by the stop edges against movement in a pivoting direction of the brake lever via longitudinal edges of the bearing shell located opposite one another that engage the stop edges.

16. The pivotable brake lever bearing arrangement according to claim 15, wherein the stop edges are configured as slots.

17. The pivotable brake lever bearing arrangement according to claim 16, wherein the slots located opposite one another have stop surfaces arranged parallel to one another.

18. The pivotable brake lever bearing arrangement according to claim 15, wherein the stop edges are formed as grooves.

19. The pivotable brake lever bearing arrangement according to claim 15, wherein the stop edges are projecting lugs.

20. The pivotable brake lever bearing arrangement according to claim 19, wherein a clear distance of the projecting lugs to one another is less than an outer distance of the associated longitudinal edges of the bearing shell to one another.

* * * * *